June 29, 1943.  J. FISCHER  2,322,798
AUTOMOBILE ACCESSORY
Filed Sept. 29, 1941
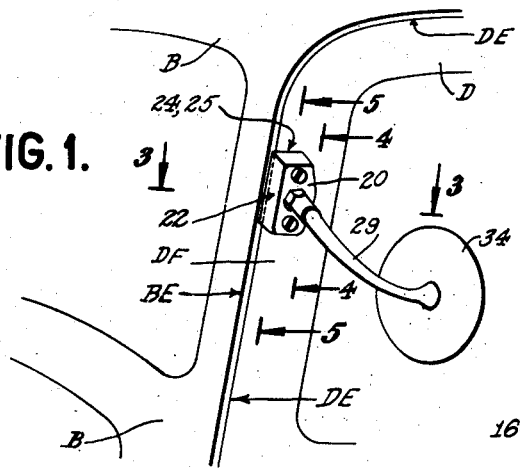
FIG. 1.
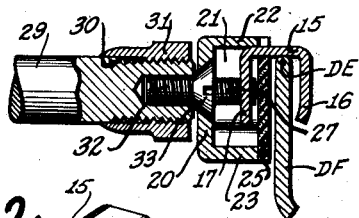
FIG. 3.
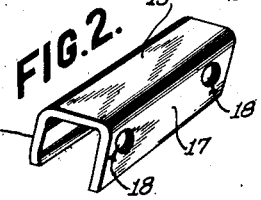
FIG. 2.
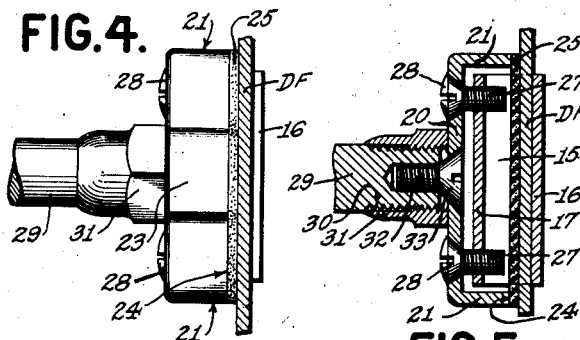
FIG. 4.  FIG. 5.
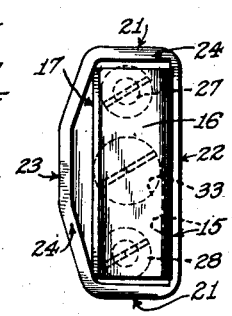
FIG. 6.
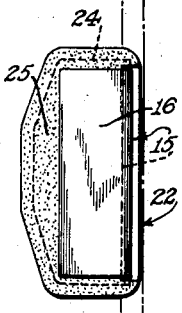
FIG. 7.
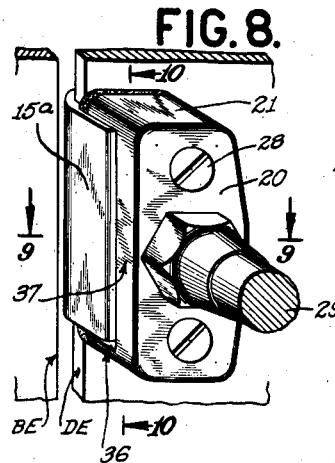
FIG. 8.
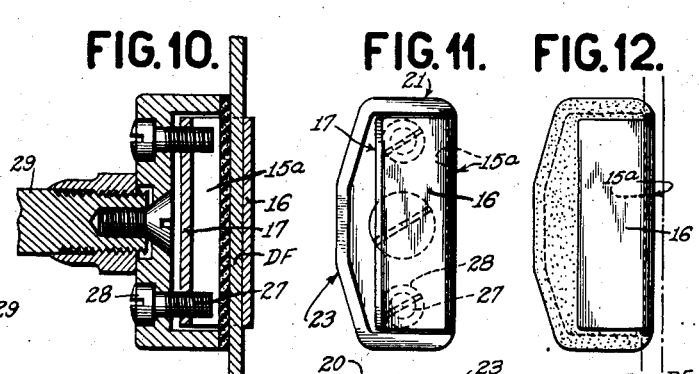
FIG. 10.  FIG. 11.  FIG. 12.
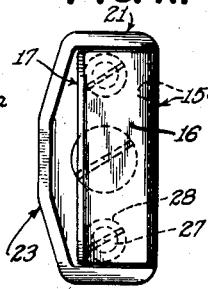
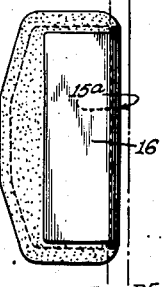
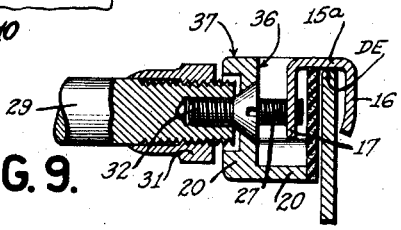
FIG. 9.  FIG. 13.
INVENTOR
JOSEPH FISCHER
BY James C. Ledbetter
ATTORNEY Patented June 29, 1943

2,322,798

UNITED STATES PATENT OFFICE 2,322,798

AUTOMOBILE ACCESSORY

Joseph Fischer, New York, N. Y.

Application September 29, 1941, Serial No. 412,716

3 Claims. (Cl. 248—226)

This invention relates to new and useful improvements in clamp and bracket means comprising an automobile accessory for use in connection with mounting a rear vision mirror, or a thermometer, an ornament or other accessory on a vehicle body, as for example on an automobile or motor truck and the like, particularly on the door flange thereof.

Mirror brackets and other accessories of the type mounted on the door flange of an automobile sometimes lack convenience in installation. Some types thereof are restricted for use on one side only of the car, or if universal and thus capable of use on either the right or left door, they may lack a positive anchorage on the door and become loose due to the vibration of the car imparted to the bracket means and its arm supporting a mirror or lamp or other accessory on the outer free end thereof.

This invention relates to a new type of automotive accessory, with new installation means, wherein my new accessory has an improved housing and clamp means which first is screw fastened in permanent position, against gasket means if desired, at the proper height on the car-door flange by one clamping means capable of use on either the right or left door of the car, and thereafter an angular adjustment is made and is then locked by another clamping means which adapts the accessory to the particular door (right or left) selected for the installation. This combined clamping means not only enables the purchaser of the accessory to more easily and permanently install it on his car but it is also found that this new combination of a double clamping means, for the door flange and for setting the angular adjustment to the right or left side of a car, possesses an advantage over prior devices having only one clamping means for both purposes.

An object, therefore, of this invention is to produce an automotive accessory having new and useful door-flange clamping means adapted to be installed with a neat and close fit on the door of an automobile without leaving an unsightly open space around the clamp housing, likewise without the necessity of drilling holes in the car, and which evenly applies clamping pressure against the door flange with a minimum of strain upon the housing member within which is fitted or embraced a part of the door-flange clamping means, together with an angular adjustment clamping means adapting the accessory to be mounted on either side of the car, that is on the right or left door.

The accompanying drawing shows the principle of the invention and examples thereof in its present preferred commercial forms, wherein Figures 1 thru 7 show a first form of the invention, and Figures 8 thru 13 a second form thereof, the separate part shown in Figure 2 being common to both forms. Figure 1 drawn to small scale illustrates the utility of the accessory clamp as manufactured for use on automobiles.

Figure 1 shows a portion of the left side and door of a motor car with this accessory, in the form of a rear vision mirror, mounted in service position on the forward flange or marginal edge of the door in closed position.

Figure 2 is a perspective view of a channel member in the form of an elongated yoke of general U-shape form in cross-section employed in both exemplary embodiments of the invention.

Figure 3 shows a transverse sectional detail through the accessory clamp on the line 3—3 of Figure 1, with both clamping means unscrewed and loosened, preparatory to installation.

Figure 4 is a view made on the line 4—4 of Figure 1 showing the accessory clamp in rear elevation secured to the door flange shown in section.

Figure 5 is a longitudinal section made on the line 5—5 centrally of Figure 1 showing both clamping means in a tightened condition, that is to say, a pair of clamping screws are tightened to anchor the accessory on the door flange, and thereafter a clamping nut is tightened to permanently lock or fix the mirror in its angularly adjusted position.

Figure 6 is a bottom view of the accessory clamp with its gasket removed, thus looking into the inside open bottom of the housing member which operatively carries the door-flange clamping means partially inside thereof.

Figure 7 also is a bottom view looking toward the inner surface of the door flange. The left hand dot-and-dash line indicates the door edge of the door flange on which the accessory clamp is mounted, and the right dot-and-dash line indicates the car body or bead up close to which the door edge swings into closed position. It is seen that this first form of the clamp may occupy substantially the entire space between the movable door edge and the stationary body.

The second form of my new accessory clamp, embodying certain of the principles and structure of the first form, is illustrated in Figures 8 thru 13 (including Figure 2) and in one way possesses an advantage over the first in requiring less space between the movable door edge and the stationary body of the car to receive the clamp. Therefore, the second form will fit a door having less space between its movable edge and the stationary body of the car. This contrast in space required for the two different forms of the invention is seen by comparing the vertically aligned Figures 7 and 12, wherein it is noted that the clamp in Figure 12 occupies less of the space between the door edge and car body edge, as represented by the parallel dot-and-dash lines.

Coming now to the views showing the second form of the accessory clamp, Figure 8 is a front perspective, after the fashion of Figure 1, except shown more nearly to actual size and with the accessory arm broken away.

Figure 9 is a transverse section, on the line 9—9 of Figure 8, with both clamping means loosened, and the clamp initially placed in position on the door flange abutting its straight edge and ready to be tightened thereon.

Figure 10 shows a longitudinal section as made on the line 10—10 centrally of Figure 8, with the first clamping means tightened on the door flange and the second clamping means tightened to lock the accessory arm in final position of adjustment in angular relation.

Figure 11 is an open bottom view, that is, with the gasket omitted and looking into the open bottom housing member.

Figure 12 is a bottom view of the second form of accessory clamp mounted upon a car-door flange, the edge of which is indicated by the left dot-and-dash line, the car body edge or bead being shown by the right dot-and-dash line. The two parallel dot-and-dash lines show the same spacing as in Figure 7 (first form), and it is noteworthy that this second form of clamp occupies a minimum of the space between the door edge and the bead or line of the car body.

Figure 13 is a perspective view of the housing member of the second form of the invention; it is formed not only with an open bottom as in the first form but also has an open front into which the Figure 2 yoke is fitted to constitute a part of the straight front wall means of the accessory clamp.

The description now to follow is directed principally to form 1 of the invention (Figures 1–7) but the description and part numbers are applied to form 2 (Figures 8–13) as to all features in common. The features which characterize and distinguish the second form of construction will be set forth at the end of this general description.

Referring further to the drawing, a corner portion of an automobile body B and a door D relatively movable thereon are shown in connection with the description of this invention and one of its environments of use. The door jamb bead or body edge is indicated at BE, while the door flange is indicated at DF, with latter having its marginal or extreme linear edge pointed out at DE. The movable door edge DE swings in quite close to the stationary body edge BE, and this relationship is noted in several views of the drawing. The parallel dot-and-dash lines in Figures 7 and 12 also show this spacing between the door edge DE and body edge BE, and in some automobiles this spacing is rather close. Therefore, a fixture or accessory clamp must be made to fit the door flange DF without striking the door jamb body edge DE when the car door D is closed.

Referring now to Figure 2, an elongated yoke or channel member 15 of general U-shape form in cross-section includes a clamping jaw 16 and an operating plate or hub means 17. The jaw and plate are disposed in parallel spaced planes and are joined as one piece by a front integral web or wall portion 15. The reference character 15 not only designates the yoke or channel-shaped clamping member as a whole but likewise its front integral or face portion. The three right-angle portions 15, 16 and 17 are the same length and this yoke engages about the door flange DF and reaches around and abuts the door edge DE, as later explained. The yoke elongated face 15 constitutes a portion of the front of the device in both forms of the invention. A screw-threaded or tapped hole 18 is made at each end of the yoke operating plate 17. This clamp operating yoke is somewhat longer than its depth and width; thus it has an over-all elongated form.

A housing member likewise of elongated form is indicated as a whole at 20, this reference character also designating its top wall. Two end walls 21 are included as a part of the housing. Likewise, there is a front wall 22 and a rear wall 23. Thus the housing member 22 has a top wall with four side walls. The front wall or face 22 is a straight one to fit the linear edge DE of the door flange, while the rear and end walls may vary in design and form. The bottom of the housing 20 is entirely open, with its bottom means or smooth edge 24 formed in a plane parallel to the top wall 20. The housing 20 is longer than its depth and width; hence it and the yoke 15 are comparable in this structural aspect.

A gasket 25 may be made with a perimeter to evenly fit with the housing perimeter defined by its four walls. The gasket rests against the bottom edge means 24 of the housing so as to prevent this metallic edge from coming in direct contact with the paint and finish on the outer surface of the door flange DF. The gasket is of rubber or fabric or fibrous composition, and it may be adhesively applied to the housing bottom edge 24 or left loose and inserted when installing the accessory on the car.

The gasket 25 may be omitted if desired, but it is common practice to use it under the housing and it may be considered as a part of the housing, say the bottom thereof. Thus with or without the gasket 25, the housing member 20 has bottom means 24, or if the gasket is used then the housing member has bottom means 24, 25, each of which is equally well adapted to directly engage or seat against the outer surface of the door flange DF in even alignment with the linear door edge DE. The housing member, particularly its bottom means with or without gasket, constitutes the outer jaw of the accessory clamp adapted to seat and seal against the outside surface of the door D, while the yoke plate 16 described in Figure 2 constitutes the inner jaw adapted to bear against the inner surface of said door, as will more fully appear.

The yoke 15 is mounted in the housing with the operating plate 17 disposed adjacent and parallel to the top wall 20, and this arrangement will be found to space said operating plate away from the outer surface of the car door flange DF. The face or front integral yoke wall portion 15 is disposed in close operating and slidably fitted engagement with or against the front wall 22 of the housing. Therefore, the clamping jaw 16 of the yoke is operatively positioned beyond the bottom means 24 or 25 of the housing and thus is in spaced parallel relation thereto.

According to the foregoing, the front wall 22 of the housing member and the front integral portion 15 of the yoke constitute the extreme front of the accessory clamp. In order to get these two front portions into as closely compacted arrangement as possible, the front face or wall 22 may be made slightly thinner than the other walls of the housing. In this way, the thickness of the two front wall portions 22 and 15 are brought together and occupy a minimum of space or thickness in their double wall relation at the extreme linear front of the accessory clamp where the spacing condition may sometimes be critical or limited in between the door edge DE and body edge BE.

A pair of clamp-operating screws 27 are employed to actuate the yoke 15 for moving it in and out relatively to the housing 20. A screw 27 is placed at each end of the housing and mounted for free turning movement through the top wall 20. The threaded end of each screw 27 operatively engages its screw hole 18 in the operating plate 17, and each screw has a head 28 which seats against and reacts from the top wall 20 of the housing. Thus by loosening the two screws 27, the yoke clamping jaw 16 can be moved outwardly to maximum spaced relation from the bottom of the housing. Conversely, by tightening the screws 27 it follows that the clamping jaw 16 is drawn inwardly toward the housing bottom means, that is, the housing edge 24 and yoke plate 16 are forcibly moved toward each other and thus constitute coacting jaws.

An accessory supporting arm 29 has its inner end externally screw threaded at 30 with a clamping nut 31 operatively carried thereon. The flat end face of the arm 29 is bored and tapped axially to receive an assembly screw 32, the head 33 of which rotatably sets within a counter-sunk aperture made centrally within the top wall 20 of the housing. This screw is inserted through the housing member and screwed tightly into the end of the arm for the purpose of permanently and loosely joining these two parts together for angular adjustment in relation to each other, as in Figure 3 (likewise Figure 9) where the screw head jams against the end face of the arm and locks therein but is free in the housing top wall 20. In this way, the screw 32, 33, joins the arm and the housing 20, without locking them together, so long as the clamping nut 31 is turned back away from and out of clamping and locking engagement with the housing.

In the operation and use of this accessory clamp, its two clamping means are loosened up as shown, for example in Figures 3 and 9. The clamping jaw is then slipped behind the door flange DF and under an inside rubber weather strip not shown but usually secured along the inner side of the door D. The two screws 27 are then tightened to draw the clamping jaw 16 toward the inner surface of the door flange F which also draws the housing 20 toward the outer surface of the door. The front integral portion 15 of the yoke is to be placed in close linear abutment with the car door edge DE before the clamping jaw 16 is tightened; the yoke and door edge being straight match each other in linear contact. The screws 27 apply a very great force to the clamping jaw 16 and force it toward the housing bottom 24, 25 for gripping the door flange.

Any suitable automobile accessory or driver's aid or safety device, such as a rear-vision mirror 34 (Figure 1), is carried on the arm 29 which tends to weight the outer free end thereof and subject the accessory clamp to vibration which might and frequently does loosen less secure devices. However, the two spaced screws 27 are located close to the housing ends and exercise a powerful even pull on the yoke 15 with the result that the screw-clamp pressure is well distributed throughout the housing and a uniform area of clamping pressure exists throughout the length of the coacting jaw means 24 and 16. Also, since the clamp-operating screws 27, 28 are adjacent the end walls 21 of the housing, it follows that there is less likelihood of the screw pressure cracking or straining the housing member.

After this accessory clamp housing 20 has been installed on the car door D as above explained (the arm-clamp nut 31 still loose), the mirror arm 29 is then angularly adjusted by orienting it slightly in relation to the housing member. This angular adjustment is made for the purpose of bringing the outer end of the arm 29 and mirror or other device 34 into suitable vision alignment with the driver's seat or position inside the car. Thereafter the clamp nut 31 is screwed down with a wrench tightly against the housing wall 20 (see Figures 5 and 10) in order to lock the arm in final position.

By the foregoing arrangement, it follows that this automobile accessory can be initially installed upon either the right or left door of a car without having to make the mirror-vision adjustment at the same time the clamp is being attached. The pitch or angular position of the door edge does not interfere with a choice of right door or left door installation. The angular adjustment of the arm 29 in relation to the housing 20 accommodates this accessory clamp to any door edge angle and to all makes and styles of cars which vary somewhat as to angle or pitch of their front door edges DE.

The screw means 30, 31 represented by the locking nut on the threaded arm 29 is illustrated as an example of one suitable means to fix the arm and housing together in immovable relation after the accessory clamp jaw means 16, 24 is set under vice-like pressure on the door flange DF.

*The accessory clamp shown in Figures 1–8*

This second type of construction modifies or alters the first formation of the accessory clamp in relation to the front wall 22 of the housing member and the front integral yoke portion 15 heretofore described. These two parts are now brought together in a compact relationship more closely and evenly defined by the same plane than in the first form of the invention. New reference numbers are employed in the following description only as to the changes which characterize Figures 8 to 13; hence the previously used reference numbers apply to all parts heretofore described.

The front wall of the housing 20 is cast or molded with a rectangular cut-out 36 (Figure 13) which leaves a long and narrow front wall or face portion 37 at the upper portion of the housing instead of the full wall face 22 heretofore described. The cut-out 36 removes the front wall at the lower part of the housing. This leaves the end walls 21 and rear wall 23 with the three-sided bottom edge means 24 which is used with or without the gasket 25 to form the outer jaw of the accessory clamp the same as heretofore described.

The same size and shape yoke 15 (Figure 2) is used in this second form of the invention. For definiteness, however, in description the front wall or integral portion is designated 15a. The yoke is fitted into the housing member 20 with the front surface of the integral portion 15a disposed in the same plane as the face portion 37 of the housing. Accordingly, the extreme front face or wall of the housing is designated 37, 15a and it is noted that the forward or outer surfaces of these two members are in the same plane.

This modified front wall arrangement of the accessory clamp avoids the double wall thickness of the first form of the device where the yoke wall 15 slides in engagement with the front housing wall 22, a structural feature achieved by omitting the front wall 22 and substituting therefor the straight integral portion 15, and here designated 15a in the latter views of the drawing. The result is that a more compact and thinner front face formation is had for the accessory clamp, and it occupies less space (Figure 12) available between the door edge DE and body edge BE than in the first form of construction (Figure 7).

In the second form of the invention, the yoke portion 15a forms the major part of the front wall of the accessory clamp, the front ends of the two walls 21 and the front edge 37 of the top wall 20 forming a smaller area thereof; while in the first form the housing has a front wall which in part covers the integral front 15 of the yoke. Both types have a straight front formation attained by mounting the housing and clamping parts in a compact front wall assembly which aligns with and fits evenly to the straight edge DE of the door flange.

This invention is presented to fill a need for a useful automobile accessory. It is understood that various modifications in construction, operation, use and method, may and often do occur to those skilled in the art, especially after benefiting from the teachings of an invention, and that this disclosure is exemplary of the principles but not limited to the present embodiment of the invention.

What is claimed is:

1. In an accessory clamp and bracket device having a housing the bottom of which is adapted to seat against the outer surface of an automobile door and make a closed-space fit thereagainst, means for securing the device on the door, comprising a channel-shaped clamping member relatively movable in the housing with all three channel sides of equal length and adapted to engage about the edge flange of the door, a screw mounted for free rotation through each end of the housing and threadedly engaged with each end of the channel member by which to apply a gripping force at said ends to draw the housing and channel member toward each other, an arm for supporting an accessory such as a mirror or the like extending outwardly from the housing midway between the two screws, means mounting the arm for angular adjustment adapting the device for use on either the right or left door, and a lock nut screw-threaded onto the arm and engageable with the housing to fix said arm in its adjusted position, whereby the housing may be first clamped on either door by the two screws and thereafter the arm adjusted and locked in position.

2. In an accessory clamp and bracket device having a housing with four walls the bottom of which is adapted to seat against the outer surface of an automobile door and make a closed-space fit thereagainst, means for securing the device on the door, comprising a channel-shaped clamping member relatively movable in the housing with all three channel sides of equal length and adapted to engage about the edge flange of the door, one side of the channel member being disposed in movable engagement with the inside surface of the front wall of the housing, a screw mounted for free rotation through each end of the housing and threadedly engaged with each end of the channel member by which to apply a gripping force at said ends to draw the housing and channel member toward each other, an arm for supporting an accessory such as a mirror or the like extending outwardly from the housing midway between the two screws, means mounting the arm for angular adjustment adapting the device for use on either the right or left door, and a lock nut screw-threaded onto the arm and engageable with the housing to fix said arm in its adjusted position, whereby the housing may be first clamped on either door by the two screws and thereafter the accessory arm adjusted and locked in position.

3. In an accessory clamp and bracket device having a housing the front side of which is open and the bottom of which is adapted to seat against the outer surface of an automobile door and make a closed-space fit thereagainst, means for securing the device on the door, comprising a channel-shaped clamping member relatively movable in the housing with all three channel sides of equal length as well as approximately the length of the housing and adapted to engage about the edge flange of the door, one of the channel sides being movably disposed within the open front side of the housing, a screw mounted for free rotation through each end of the housing and threadedly engaged with each end of the channel member by which to apply a gripping force at said ends to draw the housing and channel member toward each other, an arm for supporting an accessory such as a mirror or the like extending outwardly from the housing midway between the two screws, means mounting the arm for angular adjustment adapting the device for use on either the right or left door, and a lock nut screw-threaded onto the arm and engageable with the housing to fix said arm in its adjusted position, whereby the housing may be first clamped on either door by the two screws and thereafter the accessory arm adjusted and locked in position.

JOSEPH FISCHER.